United States Patent [19]
Mita et al.

[11] 3,950,774
[45] Apr. 13, 1976

[54] APPARATUS FOR HOLDING CLOSED A POWER SWITCH FOR AN ELECTRIC SHUTTER

[75] Inventors: Kunio Mita, Wako; Hiroshi Kurei, Kawagoe, both of Japan

[73] Assignee: Asahi Kogaku Kogyo Kabushiki Kaisha, Tokyo, Japan

[22] Filed: June 13, 1974

[21] Appl. No.: 478,852

[30] Foreign Application Priority Data
June 21, 1973  Japan................................ 48-73896

[52] U.S. Cl................ 354/266; 354/60 R; 354/258
[51] Int. Cl.²........................................ G03B 17/38
[58] Field of Search.................. 354/24, 48–51, 354/266–268, 258, 60 R

[56] References Cited
UNITED STATES PATENTS

| 3,500,729 | 3/1970 | Rentschler et al. | 354/51 |
| 3,581,633 | 6/1971 | Uno et al. | 354/51 |
| 3,657,986 | 4/1972 | Kitai | 354/258 |
| 3,713,372 | 1/1973 | Schill | 354/50 X |
| 3,731,602 | 5/1973 | Umemura | 354/50 |
| 3,791,277 | 2/1974 | Kobori et al. | 354/51 |
| 3,812,511 | 5/1974 | Hackenberg et al. | 354/258 |

*Primary Examiner*—L. T. Hix
*Assistant Examiner*—James LaBarre
*Attorney, Agent, or Firm*—Christie, Parker & Hale

[57] ABSTRACT

Apparatus provides for reducing drain on an electrical power source in a camera and also provides for convenient manual operation in connection with relatively long-exposure-time photographing by controlling the closing of a power switch that switchably connects the power source to an exposure control circuit.

1 Claim, 8 Drawing Figures

APPARATUS FOR HOLDING CLOSED A POWER SWITCH FOR AN ELECTRIC SHUTTER

BACKGROUND OF THE INVENTION

This invention relates to apparatus providing for holding the power switch which connects the exposure control circuit of an electric shutter to a power source.

To provide operating electrical power use for electric control of electric shutters, the power switches used therewith must be held continuously in a closed position for as long as the shutter is open. To this end, the shutter button, in conventional practice, must be held in a depressed position until the exposure time is over. This is generally inconvenient and is especially so in long-exposure-time photographing. Furthermore, in circumstances in which a shutter button depressing operation is interrupted at a point immediately before starting the shutter operation, the power switch is closed and held in that position. This increases the consumption of the power battery and shortens its operating life.

To minimize the time when the power switch is held in a closed position uselessly, an electric shutter may be so designed that the shutter starting point can be selected precisely by adjustment. Such a design, however, will make the manufacturing process complicated and will not be very practical.

SUMMARY OF THE INVENTION

This invention is directed to apparatus that provides for eliminating the foregoing disadvantages and yet is simple in construction.

The apparatus of this invention is embodied in combination with a camera having an exposure control circuit for controlling an electric shutter. The circuit is switchably connected by a power switch to an electric power source. The camera also includes a shutter button and a shutter rod that, upon commencement of actuation of the shutter button, begins to move along a line of travel from a start position to a shutter-actuated position.

The apparatus provides for closing the power switch. Means, including a first rotatable release member, provide for causing the power switch to close when the shutter rod, in the course of the shutter button actuation passes a predetermined point along its line of travel between its start and shutter-actuated positions. Preferably, in an early stage of shutter button actuation, the first release member, in response to this shutter button actuation, is rotated against the action of a return spring to a power-switch-closing position such that a portion of the first release member swings sufficiently as to permit the power switch, which is engaged therewith, to close and thereby interconnect the power source and the circuit. In the event that the actuation of the shutter button is interrupted before the shutter rod reaches the shutter-actuated position, the return spring is operative to urge the first release member to return to its normal position whereby the power switch is reopened.

The apparatus further includes a second rotatable release member, an arresting lever actuated by the second release member, and a shutter starting member such as a mirror-up lever of the type used in single-lens-reflex cameras. The arresting lever and the shutter starting member have engaging portions defining cam means for controlling the operation of the arresting lever.

In the complete operation of the preferred embodiment, the actuation of the shutter button progresses to the point at which the shutter rod reaches its shutter-actuated position. The first release member actuates the second release member substantially at the same stage as the power switch is closed. The second release member in turn rotates the arresting lever against the action of an urging spring. Incident to this rotation, the cam means provides for releasing the shutter starting member freeing it to rotate from a wound-up position to a released position. The second release member is operative in response to the controlled operation of the arresting lever to hold the first release member. So held, the first release member continues to keep the power switch closed.

BRIEF DESCRIPTION OF THE DRAWINGS

The accompanying drawings are elevational views of the main portion of the device according to this invention, wherein.

DETAILED DESCRIPTION

Figure 1:
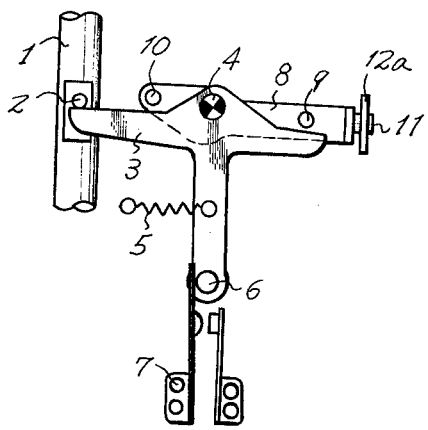
FIG. 1 is a front view relating to a start stage of operation in which the shutter button has not been actuated, and wherein a portion of the mechanism that is best shown in a left side view has been omitted.

Now the invention will be described with reference to the accompanying drawings illustrating a preferred embodiment of this invention. Indicated at 1 is a shutter rod operative in association with the shutter button and having a pin 2 fixed on it. A first rotatable release member 3, pivoted on an axis 4 and urged clockwise by a spring 5, is so arranged that an end thereof is engaged with said pin 2. An electrically insulated pin 6 is implanted at the other position on the first release member 3 so that it is in association with the contact member of a power switch 7 for the electric shutter actuating circuit. The other end of the first release member 3 is associated with a pin 9 implanted on a second rotatable release member 8 which is also pivoted on said axis 4. The second release member 8 further carries second and third pins 10 and 11.

Figure 2:
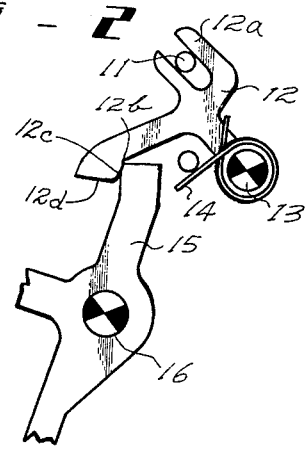
FIG. 2 is a left side view of the portion of the mechanism omitted from FIG. 1, this view best showing the association of arresting lever with shutter starting member in the position of FIG. 1.

With reference to FIG. 2, an arresting lever 12 is pivoted on an axis 13 and urged counterclockwise by means of a spring 14. The arresting lever 12 includes a bifurcate portion 12a, arresting portion 12b, first cam portion 12c and second cam portion 12d. The pin 11 on the second release member 8 extends into the opening of the bifurcate portion 12a, and one end of the mirror-up lever 15 pivoted on an axis 16 is arrested by said arresting portion 12b of the arresting lever 12.

Figure 8:
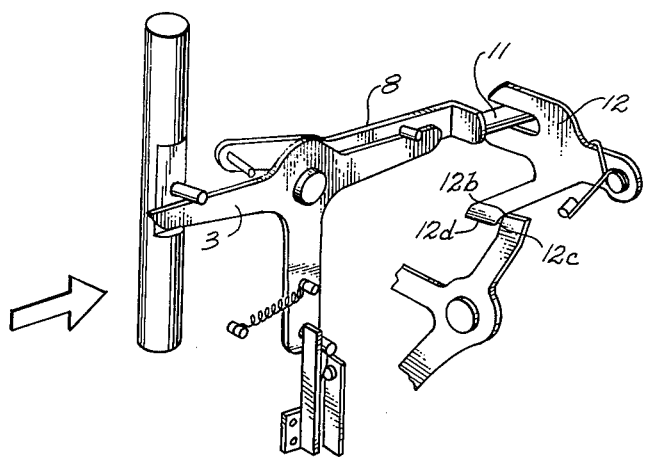
FIG. 8 is a perspective view of the preferred embodiment of the invention.

Now the operation of the foregoing mechanism will be described. FIG. 1 illustrates the mechanism in the position before the shutter rod 1 is depressed. In this start position the first release member 3 has been rotated clockwise by the spring 5 until it engages with the pin 2 on the shutter rod 1. Since the elasticity of the spring 5 is selected to be larger than that of the contact member of the power switch 7, the electrically insulated pin 6 keeps pushing the contact member of the power switch 7 in the direction to open the power switch 7. As to this start position, FIG. 3 shows the portion of the mechanism that is best seen when viewed in the direction of the arrow shown in FIG. 8.

Figure 3:
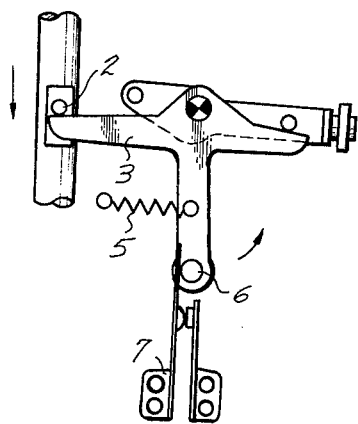
FIG. 3 is a view similar to FIG. 1 and illustrates the mechanism in the position in the early stage of shutter button operation.

FIG. 3 illustrates the mechanism in the position where the power switch 7 is closed by portionally depressing the shutter button. In the early stage of shutter button operation, the first release member 3 is torqued so as to be rotated counterclockwise against the action of the spring 5 by engagement with the pin 2 implanted on the shutter rod 1. When the first release member 3 rotates, the insulated pin 6 is displaced. At this time the contact member of the power switch 7, which has been urged by the insulated pin 6, follows the pin 6 until it reaches the original restored position to close the power switch 7. Under these conditions when the shutter button is released by the finger, the shutter rod 1 is restored by the action of a spring (not shown) to a position shown in FIG. 1 so that the power switch 7 is opened again. In the foregoing description "the early stage of shutter button operation" means the period up to the moment when the pin 9 on the second release member 8 is engaged by the first release member 3.

Figure 4:
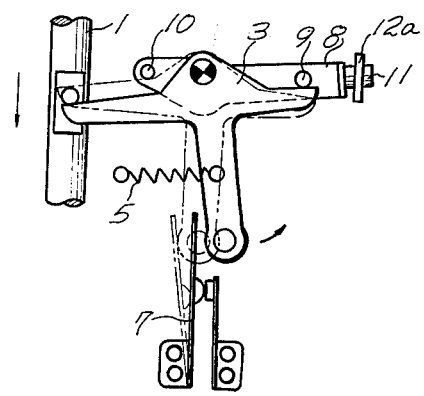
FIG. 4 is a view similar to FIG. 1 and illustrates the mechanism in the position immediately before the mirror-up lever has been released.
Figure 5:
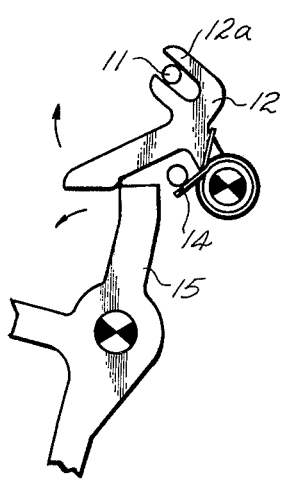
FIG. 5 is a similar view to FIG. 2 and showing the mechanism in the position of FIG. 4.

When the shutter button is further depressed, the second release member 8 is rotated counterclockwise by means of the first release member 3. Accordingly, the arresting lever 12 is rotated clockwise against the action of spring 14 by means of the pin 11 engaged in the bifurcate portion 12a, so that the arresting portion 12b of the arresting lever 12 is gradually disengaged from the mirror-up lever 15. FIGS. 4 and 5 illustrate the mechanism in the position immediately before the arresting lever 12 releasing the mirror-up lever 15.

The mirror-up lever 15 is pivotably arranged so that, upon a film winding operation, it tenses a spring (not shown) adapted to urge the mirror-up lever 15 counterclockwise. The mirror-up lever 15 is strongly urged counterclockwise and, when disengaged from the arresting lever 12, serves as a power source for directly or indirectly effecting the mirror-up and stop down operations. Since the mirror-up lever 15 is so designed as to develop a large frictional force at the engaging portion with the arresting lever 12, when the shutter button operation is interrupted in the position shown in FIGS. 4 and 5 the mirror-up lever 15 and arresting lever 12 will maintain their relative positions.

Accordingly, the second release member 8 is also held in the position in FIG. 4 by the bifurcate portion 12a engaged with the pin 11. Under these conditions if the shutter button operation is interrupted, the first release member 3 will be restored by the action of spring 5 upon restoring the shutter rod 1. The first release member 3 and the pin 10 on the second release lever 8 are so arranged that the power switch 7 is opened by the insulated pin 6 (the position shown in FIG. 4 by two-dotted line). More specifically, the position of pin 10 and the configuration and position of first release member 3 are so selected that, even when the second release member 8 stops at a position with the interruption of shutter button operation, the power switch 7 can be closed as the shutter button is restored.

Figure 6:
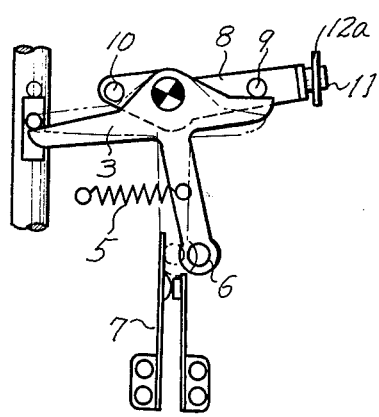
FIG. 6 is a view similar to FIG. 1 and is a view for explaining the association of release members under operation of the mirror-up lever.
Figure 7:
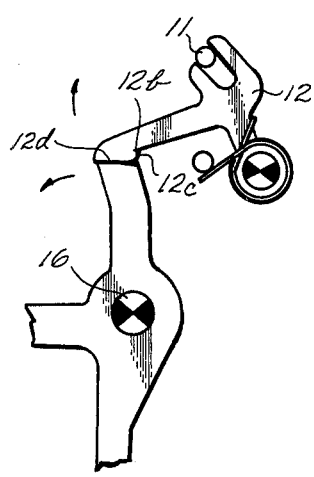
FIG. 7 is a similar view to FIG. 2 and showing the mechanism in the position of FIG. 6.

FIGS. 6 and 7 illustrate the mechanism in the position where the mirror-up lever 15 has been released by the arresting lever 12 and is ready for the next operation. When the shutter button is further depressed from the position shown in FIGS. 4 and 5, the mirror-up lever 15 is released from the arresting portion 12b of the arresting lever 12 and starts rotating rapidly. In continuation with the arresting portion 12b a first cam portion 12c is formed on the arresting lever 12 so that the arresting lever 12 is forcedly rotated clockwise in the early stage of releasing operation and, accordingly, rotates the second release member 8 counterclockwise by way of the bifurcate portion 12a and pin 11.

A second cam portion 12d continuing from the first cam portion 12c is formed to have such a configuration which cancels the displacement of arresting lever 12 during rotating the mirror-up lever 15 counterclockwise, so that the second release member 8 is maintained in its present position. This position is maintained until the shutter has been closed. In a long shutter time operation when the shutter button is released by the finger, the shutter rod 1 will restore to its original position. Although the first release member 3 is so urged as to restore to its original position following to the restoration of the shutter rod 1, it stops upon engagement with the pin 10 because the second release member 8 has been rotated counterclockwise from the position disengaged from the first cam portion 12c of the arresting lever 12 (FIG. 4) to the held position (FIG. 6) and hence the pin 10 has been displaced. In this position the power switch 7 is kept closed even after releasing the shutter button. The above-described operation of the device according to this invention will be summarized as follows:

Before the mirror-up lever 15 having been released by the arresting portion 12b when the shutter button operation is interrupted, the power switch 7 is opened upon restoration of the first release member 3. With the shutter button operation at a time after the mirror-up lever 15 has been released, the second release member 8 is held in the rotated position by means of the cam portion on the arresting member 12. This rotation of the second release member 8 displaces the pin 10 carried on it, so that the first release member 3 is engaged by the pin 10 and maintains the power switch 7 in the closed position even when the shutter button is restored during the shutter being in the open position.

As is mentioned hereinbefore the arresting portion of the arresting lever 12 includes at continuous positions the separate first and second cam portions: the first cam portion is so shaped that it displaces the second release member 8 into the early moving range of the mirror-up lever 15, while the second cam portion is so shaped that it maintains such displacement of second release member 8.

Although in the shown and described embodiment the arresting lever 12 has an arresting portion and cam portions in the position engaging with the mirror-up lever 15, the similar effects may also be attained by forming cam portions on the mirror-up lever 15 at corresponding positions.

Furthermore, although the invention has been described with respect to the device for use in a camera provided with a movable mirror, the invention may be applied also to cameras having no movable mirror.

It will be appreciated from the foregoing that according to the present invention the first release member which is operative in association with the early stage of shutter button operation is displaced for thereby actuating the power switch of the electric shutter to connect the exposure time control circuit to the power source. In response to the next stage of displacing movement of the first release member, the second release member associated with an arresting lever for a shutter starting member is displaced. At the engaging portion between the shutter starting member and arresting lever is formed a cam portion either on the shutter starting member or on the arresting lever for thereby releasing the shutter starting member from the arresting member during operation of said second release member and for controlling the displacement of the shutter starting member. The displacement of the shutter starting member is then transmitted to the first release member by way of the arresting lever and second release member. With the foregoing arrangement, the device of this invention can be made simple in construction which includes a minimum number of components and requires no subtle adjustment work. Furthermore, the device can be inexpensively manufactured and is easy to handle. With this device the power switch is held in a closed position so long as the shutter is open; while the power switch is kept open before opening the shutter, even if the shutter button depressing operation is interrupted at any position. This economizes the battery power and ensures the shutter operation.

What is claimed is:

1. In a camera having an exposure control circuit for controlling an electric shutter, the circuit being switchably connected by a power switch to an electrical power source, the camera further having a shutter button and a shutter rod that, upon commencement of actution of the shutter button, begins to translate along a line of travel from a start position to a shutter-actuated position, apparatus for closing the power switch comprising:

a first rotatable release member that is torqued to rotate from a normal position past a power-switch-closing position in response to translation of the shutter rod past a predetermined point between its start and shutter-actuated positions;

first means, engaged with the first rotatable release member, operative to close the power switch when the first rotatable release member rotates past its power-switch-closing position;

second means, operative in the event that actuation of the shutter button is interrupted before the shutter rod reaches its shutter actuated position, for urging the first rotatable release member to return to its normal position so that the first means ceases to be operative to close the power switch; and third means, operative in the event that actuation of the shutter button progresses to the point at which the shutter rod reaches its shutter-actuated position, for starting the operation of the shutter and thereafter preventing the first release member from returning to its normal position so that the first means continues to be operative to close the power switch as long as the shutter is open notwithstanding release of the shutter button and return of the shutter rod to its start position, the third means comprising:

a second rotatable release member;

an arresting lever biased to rotate about a first axis in a first direction and having an engaging portion engaged with a portion of the second rotatable release member;

the second rotatable release member being positioned to be engaged by the first rotatable release member so as to be rotatably driven by rotation of the first rotatable release member past the power-switch-closing position so as to transmit torque to the engaged portion of the arresting lever for rotatably driving the arresting lever in the second, opposite direction toward a predetermined angular position occupied when the shutter rod is at its shutter-actuated position;

a shutter starting member biased to rotate, about a second axis parallel to the first axis, in the first direction from a wound-up position to a released position;

the arresting lever and the shutter starting member having slidably engaging portions including first slidably engaging portions defining arresting means and second slidably engaging portions defining cam means, the arresting means and the cam means being operative in a sequence with the arresting means being first operative to initially retain the shutter starting member in its wound-up position and then release the arresting lever to allow it to be displaced in the direction toward which it is biased, and with the cam means becoming operative when the arresting means releases the shutter starting member so that the cam means causes the arresting lever to reach its said predetermined angular position and be retained there as a result of the displacement of the released shutter starting member; and means operative when the arresting lever is retained at its said predetermined position for preventing the first rotatable release member from returning to its normal position.

* * * * *